(12) United States Patent
Daga et al.

(10) Patent No.: US 10,297,946 B1
(45) Date of Patent: May 21, 2019

(54) APPARATUS AND METHODS FOR SEALING ELECTRICAL CONNECTIONS

(71) Applicant: TE CONNECTIVITY CORPORATION, Berwyn, PA (US)

(72) Inventors: Vijay Daga, Sunnyvale, CA (US); Kavitha Bharadwaj, Fremont, CA (US); Sunny Sethi, Castro Valley, CA (US); Ting Gao, Palo Alto, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/957,298

(22) Filed: Apr. 19, 2018

(51) Int. Cl.
| H01R 13/52 | (2006.01) |
| H01R 43/20 | (2006.01) |
| H01R 43/00 | (2006.01) |
| H01R 4/72 | (2006.01) |

(52) U.S. Cl.
CPC ....... *H01R 13/5221* (2013.01); *H01R 43/005* (2013.01); *H01R 43/20* (2013.01); *H01R 4/72* (2013.01)

(58) Field of Classification Search
CPC ....................................................... H01R 4/72
USPC ........................................ 439/523, 730, 932
See application file for complete search history.

(56) References Cited

U.S. PATENT DOCUMENTS

| 2,932,685 | A | * | 4/1960 | Raila ........................ H01R 4/20 174/84 C |
| 3,123,663 | A | | 3/1964 | Muldoon |
| 4,237,609 | A | | 12/1980 | Clabburn et al. |
| 4,501,927 | A | | 2/1985 | Sievert |
| 4,993,149 | A | | 2/1991 | Zilligen et al. |
| 4,997,689 | A | | 3/1991 | Langen et al. |
| 5,140,746 | A | * | 8/1992 | Debbaut ................ H01B 17/60 174/76 |
| 5,143,122 | A | * | 9/1992 | Adkins .................. B29C 63/42 138/103 |

(Continued)

FOREIGN PATENT DOCUMENTS

| DE | 3940698 C1 | 5/1991 |
| EP | 0267028 A2 | 5/1988 |

(Continued)

OTHER PUBLICATIONS

U.S. Appl. No. 15/426,552, filed Feb. 7, 2017.

(Continued)

*Primary Examiner* — Tho D Ta

(57) ABSTRACT

An electrical connection sealer includes an outer jacket and a low-viscosity sealant. The outer jacket includes a first piece of heat-shrinkable tubing. The outer jacket has a pre-sealed end and an open end opposite the pre-sealed end. The first piece of heat-shrinkable tubing at the open end is heat-recoverable and forms a cavity for insertion of an electrical connection. The low-viscosity sealant is insertable into the cavity. Upon application of heat to the electrical connection sealer with the electrical connection and the low-viscosity sealant in the cavity of the electrical connection sealer, the low-viscosity sealant flows across and through the first wires and the at least one second wire and the first piece of heat-shrinkable tubing shrinks to encapsulate the electrical connection and seal the electrical connection and the low-viscosity sealant substantially within the outer jacket.

14 Claims, 3 Drawing Sheets

(56) References Cited

U.S. PATENT DOCUMENTS

| | | | |
|---|---|---|---|
| 5,143,761 A * | 9/1992 | Chiotis | H01R 4/72 428/35.1 |
| 5,378,879 A | 1/1995 | Monovoukas | |
| 5,431,758 A * | 7/1995 | Delalle | H01R 4/22 156/49 |
| 5,597,620 A * | 1/1997 | Martino | B05D 5/061 427/262 |
| 5,922,992 A * | 7/1999 | Kinney | H01R 4/72 174/74 A |
| 6,079,991 A | 6/2000 | Lemke et al. | |
| 6,107,573 A * | 8/2000 | Uchiyama | H01R 4/72 174/75 R |
| 6,139,336 A | 10/2000 | Olson | |
| 6,666,732 B1 | 12/2003 | Endacott | |
| 6,869,292 B2 | 3/2005 | Johnescu et al. | |
| 7,230,214 B2 | 6/2007 | Kirby | |
| 7,364,478 B2 | 4/2008 | Xu | |
| 7,834,268 B2 * | 11/2010 | Ootsuki | H01R 4/72 174/74 A |
| 7,896,712 B2 | 3/2011 | Cecil et al. | |
| 8,951,063 B2 | 2/2015 | Iio | |
| 2007/0128925 A1 | 6/2007 | Graeve et al. | |
| 2011/0177727 A1 | 7/2011 | Zhao | |
| 2016/0013596 A1 | 1/2016 | Regnier | |
| 2018/0097344 A1 | 4/2018 | Daga et al. | |

FOREIGN PATENT DOCUMENTS

| | | |
|---|---|---|
| EP | 0270283 A2 | 6/1988 |
| EP | 0332821 A2 | 9/1989 |
| EP | 0518032 A1 | 12/1992 |
| WO | 97/23924 A1 | 7/1997 |
| WO | 2017053944 A1 | 3/2017 |
| WO | 2018064309 A1 | 4/2018 |

OTHER PUBLICATIONS

U.S. Appl. No. 15/493,342, filed Apr. 21, 2017.
"RayBlock 85, Heat-shrinkable Water-blocking System", Raychem, 2 pgs (2002).
"RayBlock 85 Sealing Kit", Protection Products Harness Design, Catalog 1654296-3, 2 pgs (2012).
"RBK-RTP-125 Tubing", Protection Products Harness Design, Catalog 1654296-3, 2 pgs (2012).
"RayBlock 105 Sealing Kit", Protection Products Harness Design, Catalog 1654296-3, 2 pgs (2012).
"Flexible, Flame-Retardant, Dual-Color, Polyolefin Tubing", Raychem Tubing Products, DCPT, 2 pgs (2016).
"Standard Test Methods for Softening Point of Resins by Ring-and-Ball Apparatus", ASTM Designation: E28-97, pp. 678-683 (1997).
"Operating Instructions: AD-3050 Seal Test Equipment", 24 pgs (2012). Available at http://www.te.com/commerce/DocumentDelivery/DDEController?Action=srchrtrv&DocNm=412-94165-1&DocType=SS&DocLang=English.

* cited by examiner

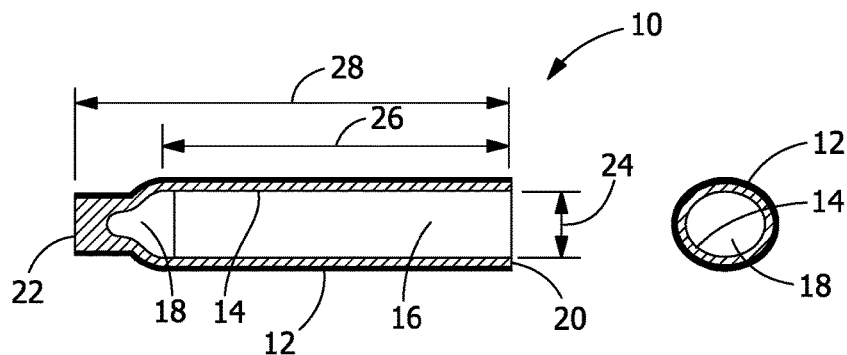
FIG. 1A  FIG. 1B
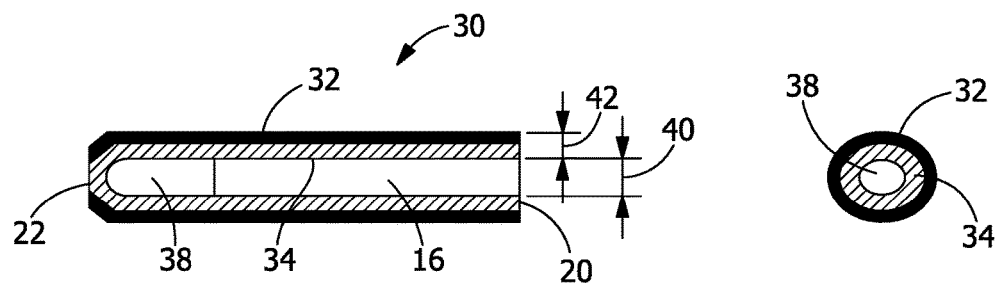
FIG. 2A  FIG. 2B
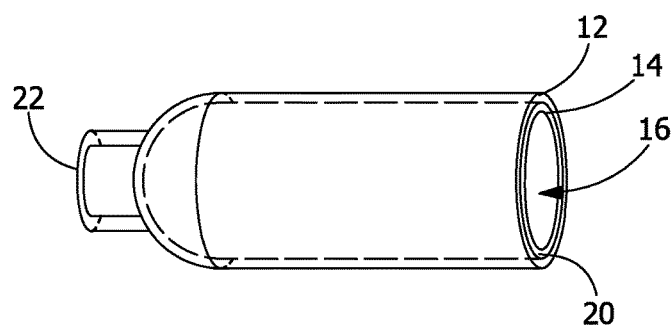
FIG. 3

APPARATUS AND METHODS FOR SEALING ELECTRICAL CONNECTIONS

FIELD OF THE INVENTION

The present disclosure relates generally to systems and methods for sealing stub splice or end splice connections and other types of electrical connections used in the automotive industry and other industries, and more specifically to sealing systems and methods that include heat-shrinkable tubing and sealant systems used in combination with heat-shrinkable tubing. The heat-shrinkable tubing systems may be single-layered systems or multi-layered systems and the sealant systems may include hot melt adhesives, butyl mastics, or other types of sealants.

BACKGROUND OF THE INVENTION

Heat-shrinkable tubing (HST) is a shrinkable plastic tube often used to insulate electrical wires. HST provides abrasion resistance and environmental sealing protection for stranded and solid wire conductors, connections, joints, and terminals used in various electrical applications. HST may also be used to repair damaged insulation on electrical wires, bundle wires together, or create cable entry seals. As stated above, HST may be a single-walled system or a multi-walled system, where the multi-walled system includes at least one heat-shrinkable layer and at least one layer of a sealant system. HST is commonly manufactured from fluoropolymers or polyolefins, which shrink radially when heated. The process of shrinking an HST is referred to as "recovering" the HST and the predetermined temperature at which an HST starts to recover is referred to as its "recovery temperature". As an HST recovers/shrinks, it exerts an inward force against the item or items it surrounds, which is referred to as the "hoop stress" of the HST. More specifically, hoop stress, also known as cylinder stress, is the force exerted circumferentially (perpendicular both to the axis and to the radius of the object) in both directions on every particle in the tubing or cylinder wall. The degree of hoop stress is determined by certain HST characteristics, such as the type of base material, the wall thickness, the degree of crosslinking, and the degree of expansion. Hoop stress is also affected by certain process parameters, such as temperature of recovery and degree of recovery.

Stub splice or end splice connections are typically used to attach at least two electrical wires at an end of the wires. The spliced electrical wires may be crimped or soldered together at the connected end. Electrical wires to be connected by splicing may include single-wire and multi-wire configurations. Multi-wire configurations have created significant challenges with regard to sealing the wire-wire or wire-connector-wire interface area on such connections. External sealant systems that include the use of HST and an adhesive/sealant layer have been previously used to create a water-tight seal between and outside of the electrical wires attached to the terminal. However, conventional sealant systems are not capable of sealing the multiple electrical wires (e.g., six or more wires) included in multi-wire configurations in a simple and reliable manner. Failure to seal the multiple electrical wires may permit water or moisture ingress and/or transfer between wires.

To overcome the limitations of sealing systems that involve the use of external adhesive and HST, the currently-used industrial approach involves a multi-component, multi-step process. This process is labor-intensive and expensive. Therefore, there is an ongoing need for a sealing system for use with stub splice or end splice connectors that meets all functional requirements in a simplistic, reliable, and cost-effective manner.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, an electrical connection sealer includes an outer jacket and a low-viscosity sealant. The outer jacket includes a first piece of heat-shrinkable tubing. The outer jacket has a pre-sealed end and an open end opposite the pre-sealed end. The pre-sealed end is closed. The first piece of heat-shrinkable tubing at the open end is heat-recoverable and forms a cavity for insertion of an electrical connection. The low-viscosity sealant is insertable into the cavity. The electrical connection is between a first insulated electrical wiring having a multi-wire configuration including a bundle of first wires and at least one second insulated electrical wiring comprising at least one second wire. The electrical connection is at a first end of the first wires and the at least one second wire. Upon application of heat to the electrical connection sealer with the electrical connection and the low-viscosity sealant in the cavity of the electrical connection sealer, the low-viscosity sealant flows across and through the first wires and the at least one second wire and the first piece of heat-shrinkable tubing shrinks to encapsulate the electrical connection and seal the electrical connection and the low-viscosity sealant substantially within the outer jacket.

In accordance with another aspect of the present invention, a method of sealing an electrical connection in an electrical connection sealer includes applying heat to an electrical connection sealing assembly. The electrical connection sealing assembly includes the electrical connection sealer, a first insulated electrical wiring, and at least one second insulated electrical wiring. The electrical connection sealer includes an outer jacket and a low viscosity sealant. The outer jacket includes a first piece of heat-shrinkable tubing. The outer jacket has a pre-sealed end and an open end opposite the pre-sealed end. The pre-sealed end is closed. The first piece of heat-shrinkable tubing at the open end is heat-recoverable and forms a cavity. The low-viscosity sealant is in the cavity. The first insulated electrical wiring has a multi-wire configuration including a bundle of first wires having a first end extending into the cavity. The at least one second insulated electrical wiring includes at least one second wire extending into the cavity. A first end of the first wires and the at least one second wire form the electrical connection. Applying the heat heat-recovers the portion of the first piece of heat-shrinkable tubing not previously heat-recovered and causes the low-viscosity sealant to flow across and through the first wires and the at least one second wire. The first piece of heat-shrinkable tubing thereby shrinks to encapsulate the electrical connection and seal the electrical connection and substantially seal the low-viscosity sealant within the outer jacket.

In accordance with yet another aspect of the present invention, an electrical connection sealing assembly includes an electrical connection sealer, a first insulated electrical wiring, and at least one second insulated electrical wiring. The electrical connection sealer includes an outer jacket and a low-viscosity sealant. The outer jacket includes a first piece of heat-shrinkable tubing. The outer jacket has a pre-sealed end and an open end opposite the pre-sealed end. The pre-sealed end is closed. The first piece of heat-shrinkable tubing at the open end is heat-recoverable and forms a cavity. The low-viscosity sealant is in the cavity. The first insulated electrical wiring has a multi-wire configuration including a bundle of first wires. The at least one second insulated electrical wiring includes at least one second wire. The first end of the bundle of first wires and the at least one second wire form an electrical connection. The electrical connection is located in the cavity of the electrical connection sealer.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention, and, together with the general description given above and detailed description given below, serve to explain the principles of the invention.

FIG. 1A is a schematic cross-sectional side view of an electrical connection sealer prior to heat recovery, in accordance with an exemplary embodiment of the present disclosure.

FIG. 1B is a schematic end view of the electrical connection sealer of FIG. 1A.

FIG. 2A is a schematic cross-sectional side view of the electrical connection sealer of FIG. 1A after heat recovery.

FIG. 2B is a schematic end view of the electrical connection sealer of FIG. 2A.

FIG. 3 is a schematic perspective view of an electrical connection sealer, in accordance with an exemplary embodiment of the present disclosure.

DETAILED DESCRIPTION OF THE INVENTION

Figure 4:
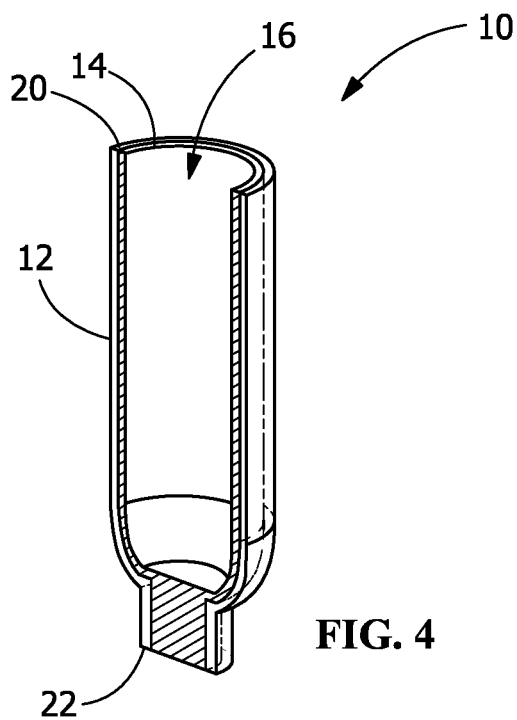
FIG. 4 is a cross-sectional view of the electrical connection sealer of FIG. 3.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

An electrical connection sealer seals an electrical connection. In exemplary embodiments, an electrical connection sealer seals a multiwire electrical connection such that both air and moisture are prevented from passing from one wire to another through the welded sealed junction.

The electrical connection sealer includes an outer jacket and a low-viscosity sealant. The outer jacket includes a heat-shrinkable tubing. The electrical connection sealer is closed on one end and open on the opposite end to provide a cavity for receiving an electrical connection to be sealed. In some embodiments, the low-viscosity sealant is a low-viscosity crosslinkable sealant. In some embodiments, the low-viscosity sealant is a low-viscosity thermoplastic (non-crosslinkable) sealant. In some embodiments, the electrical connection sealer also includes an inner core of an inner core sealant on the inner surface of the outer jacket. In some embodiments, the inner core sealant is a high-viscosity sealant. In some embodiments, the electrical connection sealer seals an end splice electrical connection. In some embodiments, the low-viscosity sealant is selected based on a temperature rating of the electrical connection sealer.

As used herein, the term "end splice" refers to any electrical connection between two or more wires terminated into one single junction.

As used herein, the term "temperature rating" refers to the maximum temperature that an electrical connection sealer is able to withstand for a specific duration of time, typically 3000 hours, with negligible current leakage, typically less than 1 microamp, and no air leakage, typically with 0.5 to 2 bar air pressure on one individual wire while other wire ends and the sealed splice end are submerged in water. In addition, the cap product does not slip out from the joint end at the rated temperature. In some embodiments, the current leakage is tested following TE specification RT-1112 procedures (TE Connectivity, Berwyn, Pa.). In some embodiments, the current leakage test includes immersing a center section of the test sample in a 23±3° C. (73±5° F.) water bath containing 5% by weight sodium chloride with the ends of the test sample a minimum of 50.8 mm (2.0 inches) above the water line and measuring a leakage current between the conductors of the test sample and the water bath after 24 hours of immersion with an applied voltage of 50 volts DC.

As used herein, the term "low-viscosity sealant" refers to a sealant composition having a viscosity less than 300 Pa·s at a heat recovery temperature of the heat-shrinkable tubing of the electrical connection sealer. In some embodiments, the low-viscosity sealant is crosslinkable and has a viscosity less than 100 Pa·s at 120° C. (248° F.) prior to crosslinking. Crosslinking during heat recovery significantly increases the viscosity of the low-viscosity sealant. In some embodiments, the low-viscosity sealant is a thermoplastic and has a viscosity less than 300 Pa·s at a heat recovery temperature of the heat-shrinkable tubing of the electrical connection sealer.

As used herein, the term "high-viscosity sealant" refers to a sealant composition having a viscosity greater than 300 Pa·s at a heat recovery temperature of the heat-shrinkable tubing of the electrical connection sealer.

With reference to the Figures, FIG. 1A and FIG. 1B show an electrical connection sealer 10 prior to heat recovery. The electrical connection sealer 10 includes an outer jacket 12 of heat-shrinkable tubing. The inner surface of the outer jacket 12 optionally includes an inner core 14 of a high-viscosity thermoplastic sealant. The inner core 14 lines the inner surface of the outer jacket 12. The outer jacket 12 and the inner core 14 define a cavity 16, into which an electrical connection to be sealed is inserted by way of an open end 20. Opposite the open end 20 of the electrical connection sealer 10 is a pre-sealed end 22, with a low-viscosity sealant 18 in the base of the cavity 16 toward the pre-sealed end 22 of the electrical connection sealer 10. The low-viscosity sealant 18 may be located or locatable anywhere within the cavity 16 that does not inhibit or prevent insertion of the electrical connection to be sealed into the cavity 16.

The low-viscosity sealant 18 may be a low-viscosity reactive crosslinkable adhesive or a low-viscosity thermoplastic (non-crosslinkable) adhesive that can withstand higher temperatures. If the low-viscosity sealant 18 is a low-viscosity crosslinkable adhesive, the electrical connection sealer 10 may be rated up to 125° C. (257° F.). If the low-viscosity sealant 18 is a low-viscosity thermoplastic adhesive, then the electrical connection sealer 10 may have different temperature ratings, depending on the selected thermoplastic adhesive. In some embodiments, the electrical connection sealer 10 is rated to 105° C. (221° F.), meaning it is robust up to 105° C. (221° F.), and a suitable low-viscosity thermoplastic adhesive that has suitable temperature resistance up to 105° C. (221° F.) is selected. For an electrical connection sealer 10 rated to 120° C. (248° F.), a suitable low-viscosity thermoplastic adhesive that withstands temperatures up to 120° C. (248° F.) is selected. Likewise, for an electrical connection sealer 10 rated to 125° C. (257° F.), a suitable low-viscosity thermoplastic adhesive that withstands temperatures up to 125° C. (257° F.) is selected. The inner core sealant of the inner core 14, when present, is also selected to be compatible with the temperature rating for the electrical connection sealer 10. In some embodiments, the inner core sealant is non-crosslinkable.

Prior to heat recovery, the electrical connection sealer 10 has a cavity width 24, a cavity length 26, and a sealer length 28, as shown in FIG. 1A. Heat recovery causes the heat-shrinkable tubing to shrink, producing a heat-recovered electrical connection sealer 30 of a heat-recovered outer jacket 32, a thickened inner core 34, and the modified low-viscosity sealant 38, as shown in FIG. 2A and FIG. 2B. When the low-viscosity sealant 18 is crosslinkable, the modified low-viscosity sealant 38 has become crosslinked by the heat recovery. After unrestricted heat recovery, as shown in FIG. 2A, the heat-recovered electrical connection sealer 30 has a heat-recovered cavity width 40 and a heat-recovered wall thickness 42. The electrical connection sealer 10 may have any appropriate cavity width 24, cavity length 26, and sealer length 28. In exemplary embodiments, the cavity width 24 is in the range of 5 to 12 millimeters (mm), the cavity length 26 is in the range of 15 to 40 mm, and the sealer length 28 is in the range of 25 to 60 mm. The heat-recovered electrical connection sealer 30 may have any appropriate heat-recovered cavity width 40 and heat-recovered wall thickness 42. TABLE 1 shows exemplary sets of dimensions.

TABLE 1

| Exemplary Sealer Dimensions (in mm) | | | |
|---|---|---|---|
| cavity width 24 | cavity length 26 | cavity width 40 | wall thickness 42 |
| 5.7 | 16.8 | 1.3 | 1.2 |
| 5.7 | 21.2 | 1.3 | 1.2 |
| 5.7 | 25.6 | 1.3 | 1.2 |
| 5.7 | 28.4 | 1.3 | 1.2 |
| 5.7 | 36.7 | 1.3 | 1.2 |
| 7.4 | 16.8 | 1.7 | 1.5 |
| 7.4 | 21.2 | 1.7 | 1.5 |
| 7.4 | 25.6 | 1.7 | 1.5 |
| 7.4 | 36.7 | 1.7 | 1.5 |
| 10.8 | 16.8 | 2.4 | 1.9 |
| 10.8 | 21.2 | 2.4 | 1.9 |
| 10.8 | 25.6 | 2.4 | 1.9 |
| 10.8 | 36.7 | 2.4 | 1.9 |

FIG. 3 provides an illustration of an electrical connection sealer 10, in the form of a splice cap, for sealing electrical connections in another exemplary embodiment of the present disclosure. With reference to FIG. 3, the electrical connection sealer 10 includes an outer jacket 12 surrounding an inner core 14 that defines a cavity 16. The electrical connection sealer 10 includes an open end 20 and a pre-sealed end 22 opposite the open end. The outer jacket 12 is heat-shrinkable tubing of a heat-shrinkable material. The heat-shrinkable tubing of the outer jacket 12 may be a single-layered system or a multi-layered system. The inner core 14 is a layer of an adhesive composition of an inner core sealant on the inner surface of the outer jacket 12. In some embodiments, the inner core sealant is a high-viscosity sealant.

With reference to FIG. 4, the pre-sealed end 22 of the electrical connection sealer 10 has been closed. Any appropriate method may be used to form the pre-sealed end 22, including, but not limited to, locally heat-recovering the heat-shrinkable tubing of the outer jacket 12 at the pre-sealed end 22 or forming the pre-sealed end 22 by molding.

In some heat-recovery embodiments, the pre-sealed end 22 is formed by pre-shrinking and end of the outer jacket 12 by thermal (heat) recovery of the outer jacket 12 at the pre-sealed end 22 by application of localized heat, with the adhesive composition of the inner core 14 at the pre-sealed end 22 plugging the remaining space within the heat-recovered heat-shrinkable tubing at the pre-sealed end 22, thereby sealing the pre-sealed end 22. Any appropriate localized heating may be used to pre-shrink the one end of the outer jacket 12. In some embodiments, ultrasonic welding pre-shrinks one end of the outer jacket 12. In some embodiments with dual wall tubing, the pre-sealed end 22 is formed by localized heating such that the adhesive of the inner core 14 flows preferentially to form a sealed end, where the heated end of the outer jacket 12 may be squeezed to cause the adhesive to flow and form the seal. In some embodiments, the pre-sealed end 22 is formed by using ultrasonic vibrations under pressure on the expanded tubing to form the pre-sealed end 22. In some embodiments, the pre-sealed end 22 is formed by shrinking the outer jacket 12 at one end around a solid insert to seal the pre-sealed end 22.

In some molding embodiments, the pre-sealed end 22 is formed by molding, including thermoforming or crosslinking the pre-sealed end 22. The crosslinking may be done, for example, with peroxide-based chemistry, silane-based chemistry, or radiation (beaming). After formation of the pre-sealed end 22, the tubing may be expanded mechanically, such as, for example, with air, by a thermal process. In molding embodiments, the entire outer jacket 12 may be formed in a mold, rather than by extrusion. In some embodiments, the pre-sealed end 22 is formed by pinching the outer jacket 12 during the extrusion process and then crosslinking, where the tubing may be expanded between the pinched sections using pressure and heat, and the expanded pieces may then be finished to provide a single wall cap with one pre-sealed end 22.

Figure 5:
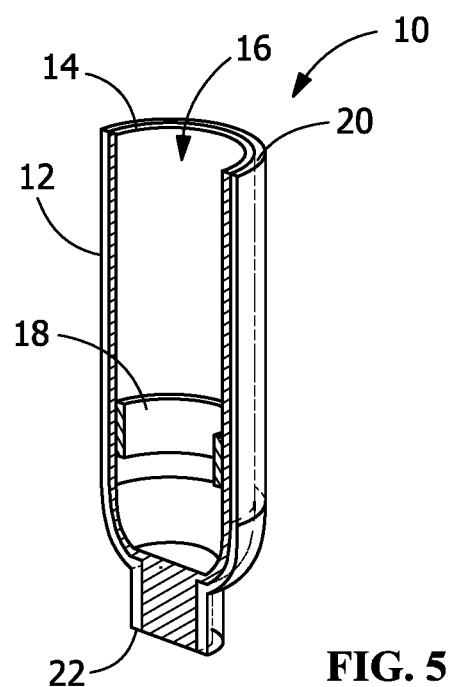
FIG. 5 is a cross-sectional view of the electrical connection sealer of FIG. 3 with an additional adhesive ring.

With reference to FIG. 5, the electrical connection sealer 10 further includes a low-viscosity sealant 18 in the form of an adhesive ring extending as an inner circumferential band around a portion of the inner surface of the inner core 14. The adhesive ring may have any appropriate dimensions and location in the cavity 16 that produce a sealed connection. In exemplary embodiments, the adhesive ring has a width in the range of about 4 mm to about 16 mm, alternatively about 4 mm to about 8 mm, or any value, range, or sub-range therebetween. In exemplary embodiments, the adhesive ring has a thickness in the range of about 0.1 mm to about 2 mm, alternatively about 0.1 mm to about 1 mm, or any value, range, or sub-range therebetween. The adhesive ring includes a low-viscosity sealant 18. The low-viscosity sealant 18 may be a crosslinkable sealant with an initial viscosity prior to thermal recovery that achieves a subsequently higher viscosity during and after thermal recovery of the electrical connection sealer 10 due to crosslinking of the crosslinkable sealant. Alternatively, the low-viscosity sealant 18 may be a thermoplastic sealant that achieves a sufficiently low viscosity at a heat recovery temperature to flow between wires.

Figure 6:
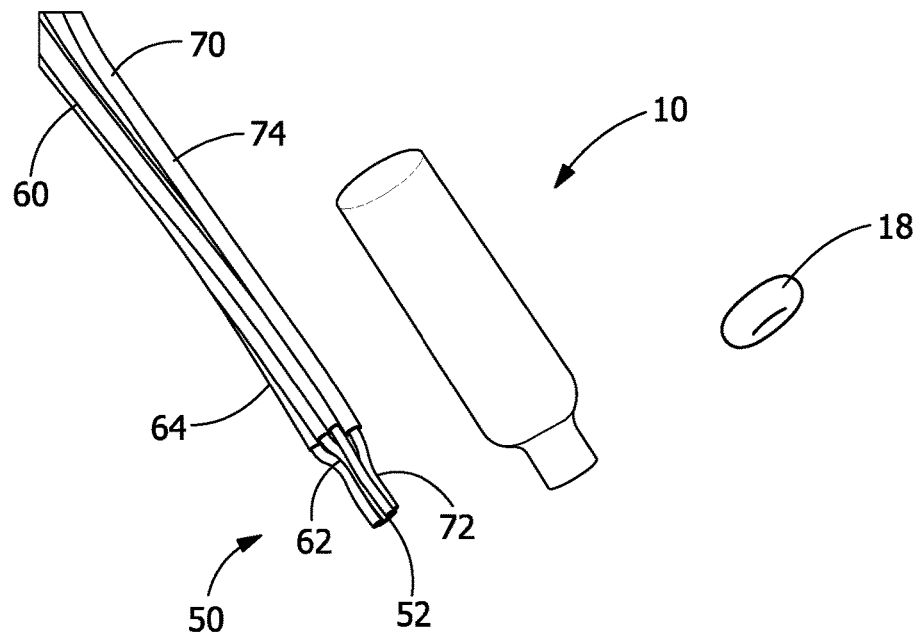
FIG. 6 is an image of a wire bundle with a welded end and an electrical connection sealer, in accordance with an exemplary embodiment of the present disclosure.

FIG. 6 is an image of an electrical connection 50 between a first insulated electrical wiring 60 and a second insulated electrical wiring 70 that is compatible with the methods and the electrical connection sealer 10 of the present disclosure. The first insulated electrical wiring 60 includes a bundle of electrical wires 62 covered by insulation 64 except at the connection end 52 of the electrical connection. The second insulated electrical wiring 70 also includes a bundle of electrical wires 72 covered by insulation 74 except at the connection end 52 of the electrical connection 50. The electrical connection 50 is a stub splice or end splice connection. The bundles of electrical wires 62, 72 are exposed and attached to each other at the connection end 52 but are otherwise covered with insulation 64, 74 and may be attached to each other by welding or crimping at the connection end 52.

Figure 7:
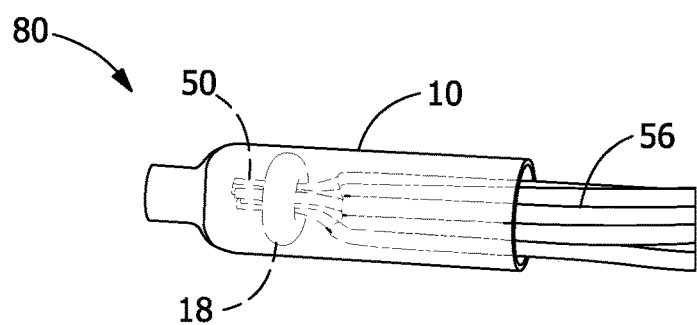
FIG. 7 is an image of the wire bundle of FIG. 6 in the electrical connection sealer of FIG. 6 prior to heat recovery.

With reference to FIG. 7, the electrical connection 50 has been inserted into the cavity 16 of the electrical connection sealer 10 to form an electrical connection sealing assembly 80. The electrical connection 50 extends into the cavity 16 of the electrical connection sealer 10 such that a portion of the insulation 64, 74 extends into the cavity 16 and the exposed part of the electrical wires 62, 72 is completely within the cavity 16. The adhesive ring of low-viscosity sealant 18 is preferably located to align with the electrical wires 62, 72 at or near the end of the insulation 56. Appropriate heat may then be supplied to the electrical connection sealer 10 to recover the outer jacket 12 and allow the low-viscosity sealant 18 of the adhesive ring to flow into spaces between electrical wires 62, 72, thereby sealing the electrical connection 50 upon cooling of the electrical connection sealer 10 such that both air and moisture are prevented from passing from one wire to another through the welded sealed junction.

The heat-shrinkable tubing of the outer jacket 12 may be any appropriate heat-shrinkable tubing composition. In some embodiments, the heat-shrinkable tubing is formed as a spirally-wrapped polyethylene terephthalate (PET) film. In other embodiments, the heat-shrinkable tubing is not spirally-wrapped and includes a composition of a blend of at least two different copolymers, including a polyolefin terephthalate copolymer, such as, for example, poly(cyclohexylene dimethylene terephthalate) glycol, poly(cyclohexylene dimethylene terephthalate) acid, poly(ethylene terephthalate) glycol, or combinations thereof.

When the low-viscosity sealant 18 composition is crosslinkable, the low-viscosity sealant 18 preferably crosslinks during the heat recovery process to recover the heat-shrinkable tubing, thereby permitting high-temperature performance of the electrical connection sealer 10. Prior to crosslinking, a low-viscosity crosslinkable sealant preferably has a melt index of about 500 g/10 min or higher.

Upon the application of heat, for example, by placement in an infrared oven for a period of about 30 seconds or another appropriate period of time, to the electrical connection sealing assembly 80, the low-viscosity sealant 18 of the adhesive ring flows across the electrical wires 62, 72, filling any air voids while the heat-shrinkable tubing of the outer jacket 12 is heat recovered to contract over the connection end 52. The outer jacket 12 shrinks to encapsulate the electrical wires 62, 72 of the electrical connection 50, thereby sealing the electrical connection 50 and substantially sealing the adhesives of the inner core 14 and the adhesive ring within the outer jacket 12.

The low-viscosity sealant 18 is designed to exhibit a low melt viscosity so that the material is capable of flowing between and around multiple electrical wires 62, 72 to provide robust sealing of an electrical connection 50 such that both air and moisture are prevented from passing from one wire to another through the welded sealed junction. In some embodiments, the low-viscosity sealant 18 is a high-flow adhesive (melt flow rate of about 500 g/10 min or higher). The low-viscosity sealant 18, as well as the inner core sealant, when present, is also capable of being reheated for temperature ratings of up to 125° C. (257° F.) without running or dripping. These characteristics may be achieved through the use of high-speed crosslinking materials, high-temperature melting polymers, or a combination of both. Regarding crosslinking materials, the low-viscosity adhesives are capable of sufficiently crosslinking under predetermined cure conditions and upon reheating, the resultant crosslinked geometry provides seal stability. Regarding high-temperature melting polymers, the adhesives typically include a base system that melts at temperatures above 125° C. (257° F.) or that shows very little flow below 125° C. (257° F.). In general, the adhesive system exhibits low viscosity once molten, but maintains its form factor at temperatures below 125° C. (257° F.).

In some embodiments, the inner core sealant of the inner core is a thermoplastic polyamide adhesive. In some embodiments, the inner core sealant has a viscosity greater than 300 Pa·s at 120° C. (248° F.). After cooling, the inner core sealant preferably has good temperature resistance with no drip at 125° C. (257° F.).

The low-viscosity sealant 18 enables sealing of the wire ends, thereby preventing moisture from wicking its way into the other wires. The seal on an electrical connection 50 sealed by an electrical connection sealer 10 may be tested by pressurizing the wire ends with air, by way of the insulation, at a pressure in the range of 0.5 bar to 2 bar, with the seal end submerged in water. In some embodiments, the seal is tested on the AD-3050 Seal Test Equipment (TE Connectivity, Berwyn, Pa.) according to the "Operating Instructions: AD-3050 Seal Test Equipment" by TE Connectivity, which is hereby incorporated by reference herein. Bubbles emanating from the electrical connection sealer 10 indicate a leak. In an alternative test, all but one wire are pressurized with air, with that one wire and the seal being submerged in water. Again, bubbles indicate a leak in the seal.

Exemplary compositions of suitable low-viscosity cross-linkable sealants appear in TABLE 2 and TABLE 3 below. In an exemplary embodiment, the polyolefin (PO) is an ethylene copolymer with a high vinyl acetate content in the range of about 18% to 42% by weight, such as, for example, an Evatane® resin, such as Evatane® 28-800 (Arkema, Colombes, France). In an exemplary embodiment, the organic peroxide is an organic peroxide accelerator, such as, for example, a VAROX® peroxide, such as 1,1-bis(t-butylperoxy)-3,3,5-trimethyl cyclohexane, sold under the trademark VAROX® 231-XL (Vanderbilt Minerals, LLC, Norwalk, Conn.).

TABLE 2

Formulation I: Crosslinkable Sealant

| Chemical Description | Wt % |
| --- | --- |
| Polyolefins (e.g., ethylene vinyl acetate) | 55%-96% |
| Organic peroxide | 2-9% |
| Crosslinking promoters (e.g., trimethallyl isocyanurate (TMAIC) or trimethylolpropane trimethacrylate (TMPTMA)) | 2-9% |
| Other additives (e.g., carbon black, waxes, tackifiers) | 0-25% |
| Antioxidants | 0-2% |

TABLE 3

Formulation II: Crosslinkable Sealant

| Chemical Description | Wt % |
| --- | --- |
| Polyolefins (e.g., ethylene vinyl acetate) | 63%-99% |
| Viscosity modifiers | 0-10% |
| Organic peroxide | 1-9% |
| Crosslinking promoters (e.g., TMAIC or TMPTMA) | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

Exemplary compositions of suitable low-viscosity thermoplastic sealants appear in TABLES 4-6 below. Additional suitable low-viscosity thermoplastic sealants in an electrical connection sealer 10 may include, but are not limited to, hot melt thermoplastic sealants, such as polyolefin-based sealants (e.g., where the base polymer is polyethylene (PE), metallocene-formed PE copolymer, metallocene-formed polypropylene (PP) copolymer, maleic anhydride functionalized PE, glycidyl methacrylate functionalized PE, or combinations thereof); polyolefin copolymer-based sealants (e.g., where the base polymer is ethylene-vinyl acetate (EVA) copolymer); polyamide-based sealants; thermoplastic elastomer (TPE)-based sealants; a polyolefin and polyamide (PA) mixture-based sealant; a polyolefin and polyolefin copolymer mixture-based sealant (e.g., PE:EVA in weight ratios in the range of 95:5 to 50:50, such as, for example, 95:5, 90:10, 75:25, or 50:50); a polyolefin copolymer and polyamide mixture-based sealant (e.g., EVA:PA in weight ratios in the range of 95:5 to 50:50, such as, for example, 95:5, 90:10, 75:25, or 50:50); a fluoropolymer; or combinations thereof.

TABLE 4

Formulation III. High-Temperature Resistance Adhesive

| Chemical Description | Wt % |
| --- | --- |
| EVA/PO/Waxes/Tackifiers | 82%-95% |
| Untreated and synthetic fumed silica | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

TABLE 5

Formulation IV. High-Temperature Resistance Adhesive

| Chemical Description | Wt % |
| --- | --- |
| Polyamide/Waxes | 82%-95% |
| Fumed silica | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

Other suitable low-viscosity thermoplastic sealants include, but are not limited to, low-viscosity polyamides, such as Technomelt PA 7901 (also known as Loctite 7901 Hysol Hot Melt Adhesive; Henkel Corporation, Rocky Hill, Conn.), with 0-1% CB (carbon black), which is used extensively for potting and encapsulating, hot melt adhesives, such as HM4229 (Bostik, Inc., Wauwatosa, Wis.), which is a plasticizer-resistant polyamide, and 3M-3789 (3M, St. Paul, Minn.), which is a thermoplastic adhesive, modified versions of these formulations, custom formulations based on EVA, m-polyolefin with waxes making it suitable for high-temperature use, and combinations thereof. Different sealants or sealant mixtures with similar characteristics may also be utilized in an electrical connection sealer 10. In the context of the present disclosure, the term "sealant" includes and encompasses adhesives, such as hot melt adhesives and other types of adhesives. In the context of the present disclosure, sealant or adhesive "melt" refers to the state of a semi-crystalline polymer or material over its melting point and/or the state of an amorphous material above its softening point, as determined by tools and techniques, such as a rheometer.

TABLE 6

Formulation V. High-Temperature Resistance Adhesive

| Chemical Description | Wt % |
| --- | --- |
| Acrylate polymer | 89%-95% |
| Fumed silica | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

In addition to the embodiments described above, other geometric variations for the electrical connection sealer 10 are possible. In some embodiments, the electrical connection sealer 10 includes only a single-wall heat shrinkable tubing and a low-viscosity sealant 18 with no inner core 14. As an alternative to an adhesive ring or a mass at the bottom of the cavity 16, the low-viscosity sealant 18 may be provided as a ring, a star, a pressed sheet, or a bead, for example, located either in the cavity 16 or outside the cavity 16, prior to forming the electrical connection sealer assembly 80. In some embodiments, the low-viscosity sealant 18 is applied to the electrical connection 50 prior to insertion of the electrical connection 50 into the cavity 16. Application of the low-viscosity sealant 18 to the electrical connection 50 may be manual or automated. Additionally, manual or automated shaping of the low-viscosity sealant 18 may occur at the time of assembly.

In some embodiments, the electrical connection sealer 10 is formed by starting with a piece of an outer jacket 12 of a heat-shrinkable tubing with a layer of an inner core 14 of a crosslinkable sealant on the inner surface of the heat-shrinkable tubing. A heat source, such as, for example, an infrared oven, includes a heating element used to shrink the heat-shrinkable tubing and melt the crosslinkable sealant at a first end to form the pre-sealed end 22. The heating element, operating at a predetermined temperature, is placed in close proximity to the first end of the heat-shrinkable tubing to provide localized heat sufficient to melt the crosslinkable sealant at the first end and heat-recover the heat-shrinkable tubing at the first end to close the opening at the first end and form the pre-sealed end 22. The provided heat is sufficiently localized to not heat-recover the heat-shrinkable tubing along most of the length of the heat recoverable tubing, including the second end, which is the open end 20 of the electrical connection sealer 10.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. An electrical connection sealer, comprising:
    an outer jacket comprising a first piece of heat-shrinkable tubing, the outer jacket having a pre-sealed end and an open end opposite the pre-sealed end, the pre-sealed end being closed, and the first piece of heat-shrinkable tubing at the open end being heat-recoverable and forming a cavity for insertion of an electrical connection; and
    a low-viscosity sealant insertable into the cavity, said low-viscosity sealant comprising a low-viscosity thermoplastic sealant selected from the group consisting of polyolefin-based sealants where the base polymer is polyethylene, metallocene-formed polyethylene copolymer, metallocene-formed polypropylene copolymer, maleic anhydride functionalized polyethylene; polyolefin copolymer based sealants where the base polymer is ethylene-vinyl acetate copolymer; polyamide based sealants; thermoplastic elastomer based sealants; polyolefin and polyamide mixture based sealants; polyolefin and polyolefin copolymer mixture based sealants; polyolefin copolymer and polyamide mixture-based sealants; fluoropolymers or combinations thereof;
    wherein upon application of heat to the electrical connection sealer with the electrical connection and the low-viscosity sealant in the cavity of the electrical connection sealer, the electrical connection being between a first insulated electrical wiring having a multi-wire configuration comprising a bundle of first wires and at least one second insulated electrical wiring comprising at least one second wire, the electrical connection being at a first end of the first wires and the at least one second wire, the low-viscosity sealant flows across and through the first wires and the at least one second wire and the first piece of heat-shrinkable tubing shrinks to encapsulate the electrical connection and seal the electrical connection and the low-viscosity sealant substantially within the outer jacket.

2. The electrical connection sealer of claim 1 further comprising an inner core on an inner surface of the outer jacket, the inner core comprising an inner core sealant.

3. The electrical connection sealer of claim 1, wherein the low-viscosity sealant is an adhesive band extending around the cavity.

4. The electrical connection sealer of claim 1, wherein the low-viscosity sealant is located at a base of the cavity.

5. The electrical connection sealer of claim 1, wherein the electrical connection is an end splice connection.

6. A method of sealing an electrical connection in an electrical connection sealer, the method comprising:
    applying heat to an electrical connection sealing assembly, the electrical connection sealing assembly comprising:
        the electrical connection sealer comprising:
            an outer jacket comprising a first piece of heat-shrinkable tubing, the outer jacket having a pre-sealed end and an open end opposite the pre-sealed end, the pre-sealed end being closed, and the first piece of heat-shrinkable tubing at the open end being heat-recoverable and forming a cavity; and
            a low-viscosity sealant in the cavity, said low-viscosity sealant comprising a low-viscosity thermoplastic sealant selected from the group consisting of polyolefin-based sealants where the base polymer is polyethylene, metallocene-formed polyethylene copolymer, metallocene-formed polypropylene copolymer, maleic anhydride functionalized polyethylene; polyolefin copolymer based sealants where the base polymer is ethylene-vinyl acetate copolymer; polyamide based sealants; thermoplastic elastomer based sealants; polyolefin and polyamide mixture based sealants; polyolefin and polyolefin copolymer mixture based sealants; polyolefin copolymer and polyamide mixture-based sealants;
        fluoropolymers or combinations thereof;
        a first insulated electrical wiring having a multi-wire configuration comprising a bundle of first wires having a first end extending into the cavity; and
        at least one second insulated electrical wiring comprising at least one second wire extending into the cavity;
    wherein a first end of the first wires and the at least one second wire form the electrical connection; inserting the electrical connection into the cavity of the electrical connection sealer, and
    wherein the applying heat heat-recovers the portion of the first piece of heat-shrinkable tubing not previously heat-recovered and causes the low-viscosity sealant to flow across and through the first wires and the at least one second wire, such that the first piece of heat-shrinkable tubing shrinks to encapsulate the electrical connection and seal the electrical connection and substantially seal the low-viscosity sealant within the outer jacket.

7. The method of claim 6, wherein the applying heat comprises a step selected from the group consisting of placing the electrical connection sealing assembly in an infrared oven and applying hot air to the electrical connection sealing assembly.

8. The method of claim 6, wherein the first piece of heat-shrinkable tubing has a predetermined hoop stress and wherein the predetermined hoop stress is adequate for pushing the low-viscosity sealant into interstices in the first wires and the at least one second wire.

9. The method of claim 6, wherein the electrical connection sealer further comprises an inner core on an inner surface of the outer jacket, the inner core comprising an inner core sealant.

10. The method of claim 6, wherein the electrical connection is an end splice connection.

11. The method of claim 6, wherein the pre-sealed end is pre-sealed by heat-recovering the first piece of heat-shrinkable tubing at the pre-sealed end or by molding the outer jacket at the pre-sealed end.

12. An electrical connection sealing assembly, comprising:
   an electrical connection sealer comprising:
      an outer jacket comprising a first piece of heat-shrinkable tubing, the outer jacket having a pre-sealed end and an open end opposite the pre-sealed end, the pre-sealed end being closed, and the first piece of heat-shrinkable tubing at the open end being heat-recoverable and forming a cavity; and
      a low-viscosity sealant in the cavity, said low-viscosity sealant comprising a low-viscosity thermoplastic sealant selected from the group consisting of polyolefin-based sealants where the base polymer is polyethylene, metallocene-formed polyethylene copolymer, metallocene-formed polypropylene copolymer, maleic anhydride functionalized polyethylene or combinations thereof; polyolefin copolymer based sealants where the base polymer is ethylene-vinyl acetate copolymer; polyamide based sealants, thermoplastic elastomer based sealants; polyolefin and polyamide mixture based sealants; polyolefin and polyolefin copolymer mixture based sealants; polyolefin copolymer and polyamide mixture-based sealants; fluoropolymers or combinations thereof;
   a first insulated electrical wiring having a multi-wire configuration comprising a bundle of first wires; and
   at least one second insulated electrical wiring comprising at least one second wire;
   wherein a first end of the bundle of first wires and the at least one second wire form an electrical connection, the electrical connection being located in the cavity of the electrical connection sealer,
   wherein the low-viscosity sealant does not flow across and through the first wires and the at least one second wire when they first inserted in the cavity.

13. The electrical connection sealing assembly of claim 12, wherein the electrical connection sealer further comprises an inner core on an inner surface of the outer jacket, the inner core comprising an inner core sealant.

14. The electrical connection sealing assembly of claim 12, wherein upon application of heat to the electrical connection sealing assembly, the low-viscosity sealant flows across and through the first wires and the at least one second wire and the first piece of heat-shrinkable tubing shrinks to encapsulate the electrical connection and seal the electrical connection and substantially seal the low-viscosity sealant within the outer jacket.

* * * * *